United States Patent
Wang et al.

(10) Patent No.: US 9,880,831 B2
(45) Date of Patent: Jan. 30, 2018

(54) FIELD FIRMWARE UPGRADING METHOD AND COMPUTER-READABLE MEDIUM

(71) Applicant: STORART TECHNOLOGY CO. LTD., Hsinchu (TW)

(72) Inventors: Yi-Ming Wang, Hsinchu County (TW); Wan-Chun Chang, Miaoli County (TW); Shih-Hung Fan, New Taipei (TW)

(73) Assignee: STORART TECHNOLOGY CO., LTD., Hsinchu (TW)

( * ) Notice: Subject to any disclaimer, the term of this patent is extended or adjusted under 35 U.S.C. 154(b) by 91 days.

(21) Appl. No.: 14/934,171

(22) Filed: Nov. 6, 2015

(65) Prior Publication Data

US 2017/0131997 A1    May 11, 2017

(51) Int. Cl.
  *G06F 9/44* (2006.01)
  *G06F 9/445* (2006.01)
(52) U.S. Cl.
  CPC .............. *G06F 8/67* (2013.01); *G06F 9/4406* (2013.01)
(58) Field of Classification Search
  CPC ..... G06F 8/60; G06F 8/65; G06F 8/67; G06F 9/4406
  USPC ......................................................... 717/168
  See application file for complete search history.

(56) References Cited

U.S. PATENT DOCUMENTS

| 6,816,963 B1* | 11/2004 | Krithivas | G06F 9/4416 710/10 |
| 7,055,148 B2* | 5/2006 | Marsh | G06F 8/65 717/172 |
| 9,118,698 B1* | 8/2015 | Radovanovic | H04L 67/1097 |
| 9,430,329 B2* | 8/2016 | Trantham | G06F 11/108 |
| 9,594,910 B2* | 3/2017 | Sarangdhar | G06F 21/575 |
| 2005/0144405 A1* | 6/2005 | Doran | G06F 3/0623 711/156 |
| 2005/0235280 A1* | 10/2005 | Le | G06F 8/65 717/173 |

(Continued)

OTHER PUBLICATIONS

Kambic et al. "Sun Fire™ Midrange Server Updated Best Practices for Firmware 5.18.x", May 2005, Sun Microsystems.*

(Continued)

*Primary Examiner* — Wei Zhen
*Assistant Examiner* — Junchun Wu
(74) *Attorney, Agent, or Firm* — Li & Cai Intellectual Property (USA) Office

(57) ABSTRACT

A field firmware upgrading method is adapted in a field firmware upgrading system having a computing device and a storage device. First, the computing device is boot up to a real-time operating system (RTOS), wherein the RTOS and a firmware of the storage device are communicated with each other via a driver. The RTOS sends reading commands to the firmware, such that the firmware performs a reading operation meeting a prefix proceeding, wherein the prefix proceeding defines an order which specific logic block addresses (LBAs) are read. After the firmware performs the reading operation meeting the prefix proceeding, the RTOS sends writing commands to the firmware, such that the firmware performs a writing operation meeting a specific writing proceeding to write an firmware image file into the storage device beginning at a target LBA defined by the specific writing proceeding.

14 Claims, 3 Drawing Sheets

(56) References Cited

U.S. PATENT DOCUMENTS

| | | | | |
|---|---|---|---|---|
| 2006/0259902 A1* | 11/2006 | Lin | ............................ | G06F 8/65 |
| | | | | 717/168 |
| 2008/0052702 A1* | 2/2008 | Chuang | ...................... | G06F 8/65 |
| | | | | 717/170 |
| 2010/0057990 A1* | 3/2010 | Mizuno | .................... | G06F 3/061 |
| | | | | 711/114 |
| 2010/0082890 A1* | 4/2010 | Heo | .................... | G06F 12/0246 |
| | | | | 711/103 |
| 2012/0198193 A1* | 8/2012 | Doran | ................... | G06F 3/0623 |
| | | | | 711/163 |
| 2013/0047144 A1* | 2/2013 | Chalmers | ................ | G06F 8/665 |
| | | | | 717/168 |
| 2014/0089630 A1* | 3/2014 | Pignatelli | ............ | G06F 12/1009 |
| | | | | 711/206 |
| 2014/0215199 A1* | 7/2014 | Ma | ........................ | G06F 9/4406 |
| | | | | 713/2 |

OTHER PUBLICATIONS

Caulfield et al. "Gordon: Using Flash Memory to Build Fast, Power-efficient Clusters for Data-intensive Applications", Mar. 2009, ACM.*

Chu et al. "A Set-Based Mapping Strategy for Flash-Memory Reliability Enhancement", 2009, EDAA.*

* cited by examiner

LBA(m)  00000000h : D0 CF 11 E0 A1 B1 1A E1 00 00 00 00 00 00 00 00
        00000010h : 00 00 00 00 00 00 00 00 3E 00 03 00 FE FF 09 00

LBA(y)  00000000h : 4D 5A 90 00 03 00 00 00 04 00 00 00 FF FF 00 00
        00000010h : B8 00 00 00 00 00 00 00 40 00 00 00 00 00 00 00

LBA(z)  00000000h : 01 23 45 67 89 AB CD EF 01 23 45 67 89 AB CD EF  ─H411
        00000010h : 20 13 14 00 00 00 00 00 00 00 00 00 00 00 00 00
                   └─C412

LBA(k)  00000000h : 01 23 45 67 89 AB CD EF 01 23 45 67 89 AB CD EF  ─H421
        00000010h : 52 01 31 40 00 00 00 00 00 00 00 00 00 00 00 00
                   └─C422

FIG.4

FIELD FIRMWARE UPGRADING METHOD AND COMPUTER-READABLE MEDIUM

BACKGROUND

1. Technical Field

The disclosure is related to a storage device, and in particularly, to a field firmware upgrading method which is used to upgrade a firmware of the storage device via a real-time operating system (RTOS), such as Windows®, Linux®, or Android®, and to a computer-readable medium which has codes to execute the field firmware upgrading method, wherein the computer-readable medium is a non-transitory medium.

2. Description of Related Art

With development of electronic technology, storage devices of different kinds are proposed. In early periods, the products of storage devices utilizing magnetic medium as storage mediums have problems of slow accessing speeds. Thus, most current products of the storage devices, such as Micro Secure Digital memory (SD) cards, embedded MultiMediaCards (eMMCs), or Solid State Disks (SSDs) adapt NAND flash memories as storage mediums.

For a user, performance and reliability of the storage device should achieve a certain level, and thus, under some condition, the firmware of the storage device should be upgraded to improve the performance and the reliability. For some storage device, such as eMMc, only when a host enters a specific mode, can the firmware be upgraded. For example, the host should firstly enter a boot mode, and then the host is allowed to input commands provided by the equipment vendor to perform specific functions for upgrading the firmware. However, it is not convenient for user to use the conventional firmware upgrading manner.

SUMMARY

One exemplary embodiment of the present disclosure provides a field firmware upgrading method adapted in a field firmware upgrading system having a computing device and a storage device. First, the computing device is boot up to a RTOS, wherein the RTOS and a firmware of the storage device are communicated with each other via a driver. The RTOS sends reading commands to the firmware, such that the firmware performs a reading operation meeting a prefix proceeding, wherein the prefix proceeding defines an order which specific logic block addresses (LBAs) are read. After the firmware performs the reading operation meeting the prefix proceeding, the RTOS sends writing commands to the firmware, such that the firmware performs a writing operation meeting a specific writing proceeding to write an firmware image file into the storage device beginning at a target LBA defined by the specific writing proceeding.

One exemplary embodiment of the present disclosure provides a non-transitory computer-readable medium having codes to execute the field firmware upgrading method.

To sum up, exemplary embodiments of the present disclosure provide a field firmware upgrading method and a computer-readable medium thereof, and the firmware upgrading method can upgrade the firmware of the storage device via the RTOS, such that it is convenient for the user to upgrade the firmware of storage device by using the firmware upgrading method.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings provide a further understanding to the present disclosure, and are incorporated in and constitute a part of this specification. The drawings illustrate exemplary embodiments of the present disclosure and, together with the description, serve to explain the principles of the present disclosure.

FIG. 4 is a schematic diagram showing contents at LBAs of a flash memory according to one exemplary embodiment of the present disclosure.

DESCRIPTION OF THE EXEMPLARY EMBODIMENTS

Figure 1:
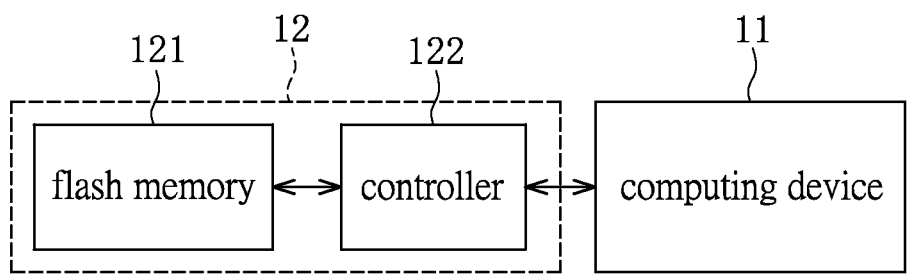
FIG. 1 is a schematic diagram of a field firmware upgrading system according to one exemplary embodiment of the present disclosure.

Reference will now be made in detail to exemplary embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the exemplary embodiments.

One exemplary embodiment of present disclosure provides a field firmware upgrading method for upgrading a firmware of a storage device via a RTOS (such as Windows®, Linux®, or Android®). Without making a host (such as a computing device) enter a specific mode, a user can send commands to the firmware via the RTOS to perform specific functions corresponding to firmware upgrading. For example, the field firmware upgrading method can be carried out by an application of Android® system, and the user activates the application of Android® system to upgrade the firmware with ease. Furthermore, one exemplary embodiment of present disclosure provides a computer-readable medium having codes to execute the field firmware upgrading method, wherein the computer-readable medium is a non-transitory medium.

The RTOS and the firmware are communicated with each other via a driver, and the field firmware upgrading method is illustrated as follows. First, the RTOS sends reading commands to the firmware. The firmware checks whether a reading operation which LBAs are read meets a prefix proceeding of specific LBAs. If the reading operation meets the prefix proceeding, the firmware replies a challenge key to the RTOS based on content at the last specific LBA of the prefix proceeding. The RTOS waits information replied from the firmware, to inspect whether the reading operation meets the prefix proceeding, and whether the challenge key is received.

After the RTOS receives the challenge key, the RTOS decrypts the challenge key to reply an answer message to the firmware, wherein the answer message comprises information of a target LBA. If the firmware determines the answer message is correct, the firmware reads content at the target LBA of the answer message, so as to reply an acknowledgement (ACK) message to the RTOS based on the content at the target LBA. After the RTOS receives the ACK message, it means that a handshaking confirm between the firmware and the RTOS has been finished, and a firmware image file will be further written beginning at the target LBA.

Next, the RTOS sends writing commands which write the firmware image file with a checksum beginning at the target LBA to the firmware. Next, after the firmware receives the writing commands, the firmware writes the firmware image file with the checksum beginning at the target LBA, such that after the firmware image file with the checksum has been written successfully, the firmware upgrading of the storage device is finished.

The storage device can be a storage device in the computing device (such as build-in SSD), or can be an externally connected or extended storage device (such as Micro SD card or eMMc). It is noted that, only when a v4.x versioned eMMc enters a booting mode, can the v4.x versioned eMMc upgrade the firmware. Thus, it is convenient for the user to use the field firmware upgrading method according to one exemplary embodiment of the present disclosure to upgrade the firmware through the RTOS. A v5.x versioned eMMc currently can allow the user to upgrade the firmware of via the RTOS, but the detailed implementation manner is not the same as that of the field firmware upgrading method according to one exemplary embodiment of the present disclosure, that is, the field firmware upgrading method according to one exemplary embodiment of the present disclosure can be also used in the v5.x versioned eMMc. In short, according to the above description, the type of the storage device is not used to limit the present disclosure.

Referring to FIG. 1, FIG. 1 is a schematic diagram of a field firmware upgrading system according to one exemplary embodiment of the present disclosure. The computing device 11 as a host and the storage device 12 form a field firmware upgrading system 1, wherein the computing device 11 electrically connects the storage device 12. The storage device 12 comprises a flash memory 121 and a controller 122, wherein the flash memory 121 is electrically connected to the controller 122. In the exemplary embodiment, the storage device 12 is an externally connected or extended flash memory storage device, but in one other exemplary embodiment, the storage device 12 can be the build-in flash memory storage device of the computing device 11. In short, the type of the storage device 12 is not used to limit the present disclosure.

Figure 2:
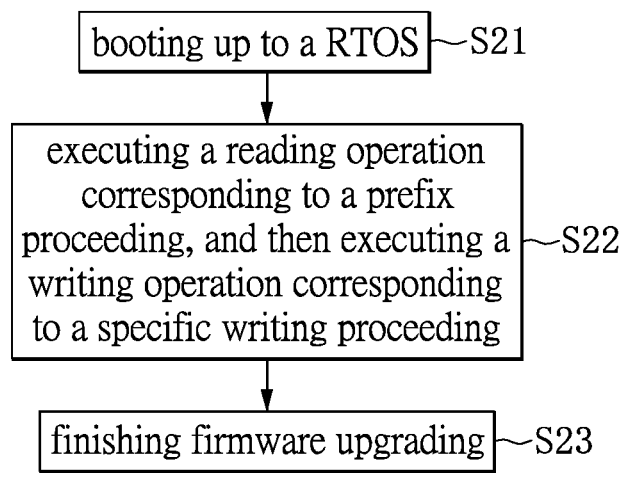
FIG. 2 is a flow chart of a field firmware upgrading method according to one exemplary embodiment of the present disclosure.

Next, referring to FIG. 1 and FIG. 2 simultaneously, FIG. 2 is a flow chart of a field firmware upgrading method according to one exemplary embodiment of the present disclosure. The field firmware upgrading method can be executed in the field firmware upgrading system 1 of FIG. 1, and specifically, a RTOS is running on the computing device 11, and the RTOS is communicated with a firmware of the storage device 12 via a driver. Codes of the firmware can be stored in the flash memory 121, and executed by the controller 112 to execute the firmware to control access of the flash memory 121.

First, at step S21, the computing device 11 is boot up to the RTOS (i.e. RTOS is running). Next, at step S22, the RTOS sends reading commands to the firmware to perform a reading operation corresponding to a prefix proceeding, and after the reading operation corresponding to the prefix proceeding is performed, the RTOS sends writing commands to the firmware to perform a writing operation corresponding to a specific writing proceeding, so as to write a firmware image file having a checksum into the flash memory 121, wherein the specific writing proceeding defines a start LBA at which the firmware image file is written (i.e. also called a target LBA in the present disclosure). Next, at step S23, the firmware upgrading has been finished.

Furthermore, at step S22, after the reading operation corresponding to the prefix proceeding is performed, the RTOS can obtain a challenge key, and next, the RTOS can obtain the target LBA from an answer message which is based on the challenge key. After the firmware confirms the answer message, and reads content at the target LBA to retrieve an acknowledgement (ACK) message, the firmware replies the ACK message to the RTOS. Then, the RTOS sends the writing commands to the firmware to write the firmware image file with the checksum beginning at the target LBA (i.e. performing the writing operation corresponding to the specific writing proceeding, wherein the specific writing proceeding defines the target LBA as the start LBA at which the firmware image file is written).

Figure 3:
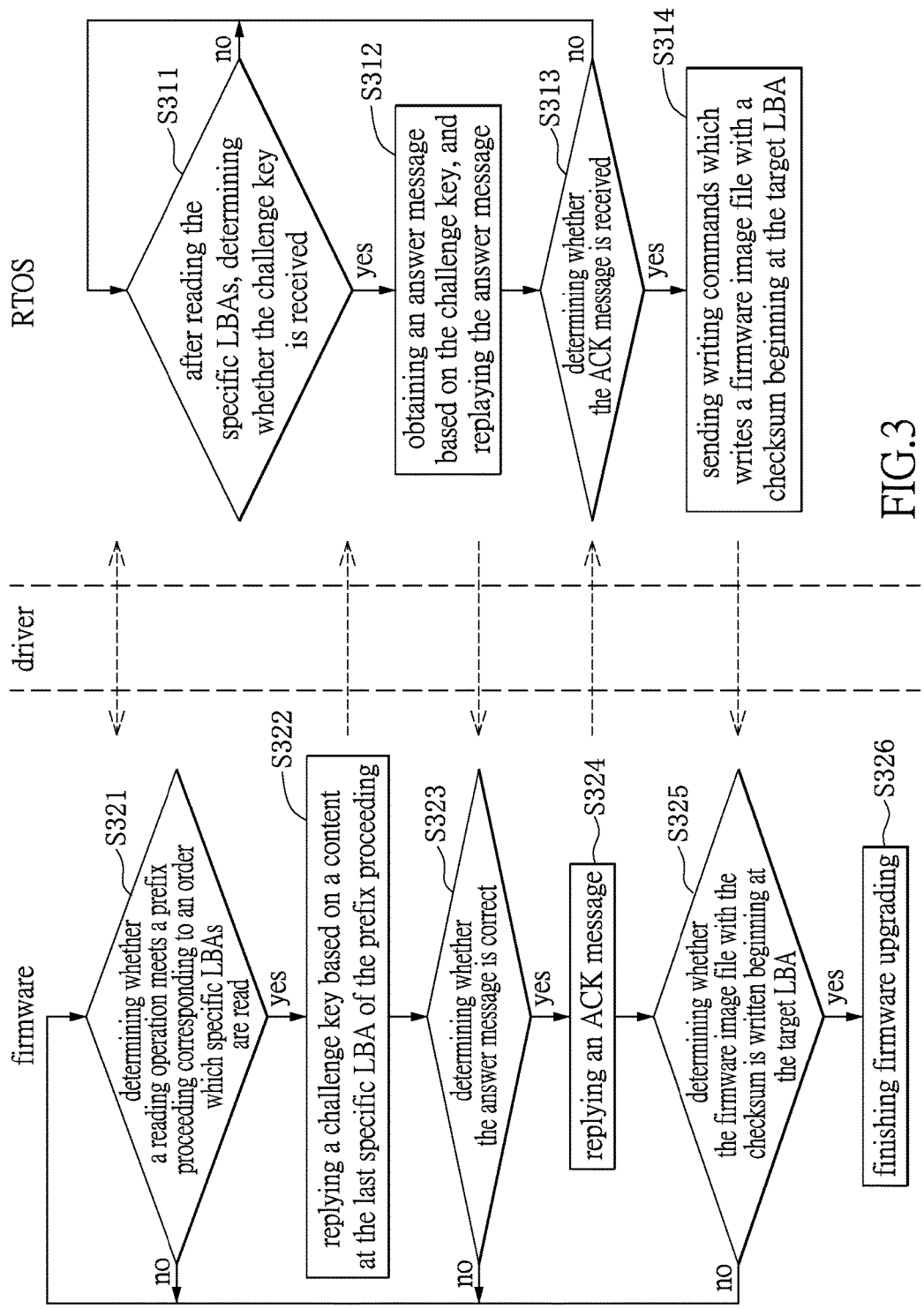
FIG. 3 is a detailed flow chart of a field firmware upgrading method according to one exemplary embodiment of the present disclosure.

Next referring to FIG. 3, FIG. 3 is a detailed flow chart of a field firmware upgrading method according to one exemplary embodiment of the present disclosure. In FIG. 3, the RTOS and the firmware of the storage device are communicated with each other via the driver, the RTOS sends the reading commands to the firmware, and the firmware reads LBAs of the flash memory. Thus, at step S311, the RTOS waits the firmware to reply information to determine whether the reading operation which the LBAs are read meets the prefix proceeding of the specific LBAs, wherein the prefix proceeding defines an order which the specific LBAs are read. If the reading operation meets the prefix proceeding, the RTOS determines whether the challenge key replied by the firmware is received. When the RTOS receives the challenge key replied by the firmware, the RTOS executes next step S312; otherwise, step S311 is still executed by the RTOS.

At step S321, the firmware determines whether the reading operation which the LBAs are read meets the prefix proceeding of the specific LBAs, and thus replies corresponding information to the RTOS accordingly. When the reading operation meets the prefix proceeding, the firmware execute next step S322; otherwise, step S321 is still executed by the firmware. Next, at step S322, the firmware obtains the challenge key based on the content at the last specific LBA of the prefix proceeding, and replies the challenge key to the RTOS.

Referring to FIG. 3 and FIG. 4 simultaneously, FIG. 4 is a schematic diagram showing contents at LBAs of a flash memory according to one exemplary embodiment of the present disclosure. At step S311, based on the information replied by the firmware, the RTOS determines whether the firmware sequentially reads content at LBA(m), LBA(n), LBA(o), LBA(p), . . . , LBA(y), LBA(z), wherein m, n, . . . , y, z, are different from each other, and are not limited in the ascending or descending order. That is, the prefix proceeding defines the order which the specific LBAs are read is the order which LBA(m), LBA(n), LBA(o), LBA(p), . . . , LBA(y), LBA(z) are sequentially read. In short, the RTOS determines whether the information replied by the firmware for indicating that the reading operation meets the prefix proceeding is true. If the information replied by the firmware is true, then the RTOS determines whether the firmware replies the challenge key C412.

In addition, at step S321, the firmware determines whether the content at LBA(m), LBA(n), LBA(o), LBA(p), . . . , LBA(y), LBA(z) are sequentially read, and replies the corresponding information to the RTOS. If the content at LBA(m), LBA(n), LBA(o), LBA(p), . . . , LBA(y), LBA(z) are sequentially read, the firmware replies the challenge key C412 to the RTOS based on the content at the LBA(z). It is noted that, the content at LBA(z) comprises a header H411 and a challenge key C412, wherein the header H411 is further checked by the firmware to confirm whether the challenge key C412 at LBA(z) is correct. In one other exemplary embodiment, the header H411 can also be the portion of the challenge key C412.

In another one hand, though the above prefix proceeding is presentation of the order which LBA(m), LBA(n), LBA(o), LBA(p), . . . , LBA(y), LBA(z) are sequentially read, in one other exemplary embodiment, the prefix proceeding can be presentation of an address differential sequence comprising address differential values of each two sequential ones of LBA(m), LBA(n), LBA(o), LBA(p), . . . , LBA(y), LBA(z). In this one other exemplary embodiment, if an address differential sequence which are formed by each two sequential ones the read LBAs meets the address differential sequence of the prefix proceeding, it means that the reading operation meets the prefix proceeding.

Next, going back to refer to FIG. 3, at step S312, the RTOS obtains the target LBA based on the challenge key, and sends the reading command to firmware to read the content at the target LBA. That is, RTOS decrypts the challenge key to obtain the answer message, and the answer message is replied to the firmware to order the firmware perform the reading operation according to the answer message, such that the content at the target LBA is read by the firmware, wherein the answer message comprises information of the target LBA. At step S323, the firmware determines the answer message replied by the RTOS is correct, i.e. whether the target LBA is correct. If the answer message is correct, the firmware further execute step S324; otherwise, step S321 is still executed by the firmware.

Next, at step S324, the firmware reads the content at the target LBA, and based on the content at the target LBA, replies the ACK message to the RTOS. At step S313, the RTOS determines whether the ACK message is received. If the RTOS receives the ACK message, the RTOS executes step S314 next; otherwise, step S311 is still executed by the RTOS.

At step S314, the RTOS sends writing commands to the firmware to write the firmware image file with the checksum beginning at the target LBA. Then, after the firmware receives the writing commands, at step S325, the firmware writes the firmware image file with the checksum beginning at the target LBA, and determines whether the firmware image file is written successfully. If the firmware image file is written successfully, the firmware executes step S326 next; otherwise, the firmware executes step S321 again. It is noted that the checksum is not used to limit the present disclosure, and in other words, the firmware image file without the checksum can be also written. However, to increase the data accuracy, the general design is to write the firmware image file with the checksum.

Referring to FIG. 3 and FIG. 4 simultaneously, specifically, at step S312, the RTOS decrypts challenge key C412 to obtain the answer message which comprises the information of the target LBA, i.e. LBA(k). Then, at step S323, the firmware check whether the target LBA, i.e. LBA(k), in the answer message is correct, and at step S324, the firmware reads the content at the target LBA, i.e. LBA(k), to obtain the ACK message C422, and replies the ACK message C422 to the RTOS. At step S313, the RTOS checks whether the ACK message C422 is received. At step S314, the RTOS sends writing commands to the firmware to write the firmware image file with the checksum beginning at the target LBA, i.e. LBA(k). Next, at step S325, the firmware writes the firmware image file with the checksum beginning at the target LBA, i.e. LBA(k), and determines whether the firmware image file is written successfully.

It is noted that, the content at LBA(k) comprises a header H421 and the ACK message C422, wherein the header H421 can be checked by the firmware to confirm whether the ACK message C422 at LBA(k) is correct. In one other exemplary embodiment, the header H421 can also be the portion of the ACK message C422. In addition, the challenge key C412 is dynamically generated while the field firmware upgrading method is executed, and the target LBA, i.e. LBA(k), and the ACK message C422 are thus dynamically generated. In short, the content at LBA(m) through LBA(y) are original data stored in the flash memory, and the content at LBA(z) and LBA(k) are dynamically generated dummy data which are dedicated to the handshaking confirm between the firmware and the RTOS.

Accordingly, exemplary embodiments of the present disclosure provide a field firmware upgrading method and a computer-readable medium thereof, and the firmware upgrading method can upgrade the firmware of the storage device via the RTOS. The field firmware upgrading method can be adapted for storage devices of different kinds, and especially for the v4.x versioned eMMc, such that without the host (i.e. computing device) entering the specific mode, the user can input commands to the firmware to perform specific functions corresponding to the firmware upgrading via the RTOS. Thus, it is convenient for the user to upgrade the firmware of storage device by using the firmware upgrading method. Furthermore, the field firmware upgrading method has the high security level, the non-licensed recording for obtaining the storing address of the firmware image file can be avoided, and thus the malicious person cannot alter the content of the firmware image file as she or he wishes.

The foregoing description, for purpose of explanation, has been described with reference to specific exemplary embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure, to thereby enable others skilled in the art to best utilize the various exemplary embodiments with various modifications as are suited to the particular use contemplated.

What is claimed is:

1. A field firmware upgrading method, adapted in a field firmware upgrading system having a computing device and a storage device, wherein the field firmware upgrading method comprises:

booting up the computing device to a real-time operating system (RTOS), wherein the RTOS and a firmware of the storage device are communicated with each other via a driver;

sending reading commands to the firmware from the RTOS, such that the firmware performs a reading operation meeting a prefix proceeding, wherein the prefix proceeding defines an order which specific logic block addresses (LBAs) are read; and after the firmware performs the reading operation meeting the prefix proceeding, sending writing commands to the firmware from the RTOS, such that the firmware performs a writing operation meeting a specific writing proceeding to write an firmware image file into the storage device beginning at a target LBA defined by the specific writing proceeding;

wherein after the firmware receives the reading commands, the firmware determines whether the reading operation which LBAs are read meets the prefix proceeding, and replies corresponding information to the RTOS accordingly; if the reading operation meets the prefix proceeding, the firmware replies a challenge key to the RTOS according to content at the last specific LBA of the prefix proceeding;

wherein the content at the last specific LBA of the prefix proceeding comprises a header and the challenge key, and the firmware checks the header to confirm the challenge key.

2. The field firmware upgrading method of claim 1, wherein the RTOS decrypts the challenge key to obtain an answer message including information of the target LBA, and replies the answer message to the firmware to order the firmware to read content at the target LBA.

3. The field firmware upgrading method of claim 2, wherein the firmware further checks whether the answer message is correct, and if the answer message is correct, the firmware reads the content at the target LBA to obtain an acknowledgement (ACK) message, and replies the ACK message to the RTOS.

4. The field firmware upgrading method of claim 3, wherein the content at the target LBA comprises a header and the ACK message, and the firmware checks the header to confirm the ACK message.

5. The field firmware upgrading method of claim 1, wherein the challenge key, the target LBA, and the ACK message are generated dynamically.

6. The field firmware upgrading method of claim 1, wherein the firmware image file has a checksum.

7. The field firmware upgrading method of claim 1, wherein the order which the specific LBAs are read is an address differential sequence of the specific LBAs.

8. A non-transitory computer-readable medium, comprising codes to execute a field firmware upgrading method, wherein the field firmware upgrading method is adapted in a field firmware upgrading system having a computing device and a storage device, and the field firmware upgrading method comprises:

booting up the computing device to a RTOS, wherein the RTOS and a firmware of the storage device are communicated with each other via a driver;

sending reading commands to the firmware from the RTOS, such that the firmware performs a reading operation meeting a prefix proceeding, wherein the prefix proceeding defines an order which specific LBAs are read; and after the firmware performs the reading operation meeting the prefix proceeding, sending writing commands to the firmware from the RTOS, such that the firmware performs a writing operation meeting a specific writing proceeding to write an firmware image file into the storage device beginning at a target LBA defined by the specific writing proceeding;

wherein after the firmware receives the reading commands, the firmware determines whether the reading operation which LBAs are read meets the prefix proceeding, and replies corresponding information to the RTOS accordingly; if the reading operation meets the prefix proceeding, the firmware replies a challenge key to the RTOS according to content at the last specific LBA of the prefix proceeding;

wherein the content at the last specific LBA of the prefix proceeding comprises a header and the challenge key, and the firmware checks the header to confirm the challenge key.

9. The non-transitory computer-readable medium of claim 8, wherein the RTOS decrypts the challenge key to obtain an answer message including information of the target LBA, and replies the answer message to the firmware to order the firmware to read content at the target LBA.

10. The non-transitory computer-readable medium of claim 9, wherein the firmware further checks whether the answer message is correct, and if the answer message is correct, the firmware reads the content at the target LBA to obtain an ACK message, and replies the ACK message to the RTOS.

11. The non-transitory computer-readable medium of claim 10, wherein the content at the target LBA comprises a header and the ACK message, and the firmware checks the header to confirm the ACK message.

12. The non-transitory computer-readable medium of claim 8, wherein the challenge key, the target LBA, and the ACK message are generated dynamically.

13. The non-transitory computer-readable medium of claim 8, wherein the firmware image file has a checksum.

14. The non-transitory computer-readable medium of claim 8, wherein the order which the specific LBAs are read is an address differential sequence of the specific LBAs.

* * * * *